United States Patent
Ahad et al.

(10) Patent No.: US 9,448,928 B2
(45) Date of Patent: Sep. 20, 2016

(54) SYSTEM AND METHOD FOR TWO-TIER ADAPTIVE HEAP MANAGEMENT IN A VIRTUAL MACHINE ENVIRONMENT

(71) Applicant: ORACLE INTERNATIONAL CORPORATION, Redwood Shores, CA (US)

(72) Inventors: Rafiul Ahad, Fremont, CA (US); Adriano Santos, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 213 days.

(21) Appl. No.: 14/145,720

(22) Filed: Dec. 31, 2013

(65) Prior Publication Data

US 2014/0324924 A1 Oct. 30, 2014

Related U.S. Application Data

(60) Provisional application No. 61/816,658, filed on Apr. 26, 2013.

(51) Int. Cl.
*G06F 12/02* (2006.01)
*G06F 9/455* (2006.01)

(52) U.S. Cl.
CPC ....... *G06F 12/0253* (2013.01); *G06F 9/45558* (2013.01); *G06F 12/0276* (2013.01); *G06F 2009/45583* (2013.01); *G06F 2212/1016* (2013.01); *G06F 2212/1044* (2013.01)

(58) Field of Classification Search
CPC .......... G06F 12/0253; G06F 9/45558; G06F 2009/45583; G06F 12/0276; G06F 2212/1016; G06F 2212/1044

USPC ......................................................... 707/813
See application file for complete search history.

(56) References Cited

U.S. PATENT DOCUMENTS

| | | | | |
|---|---|---|---|---|
| 6,065,019 A | * | 5/2000 | Ault ..................... | G06F 9/5016 |
| 6,065,020 A | * | 5/2000 | Dussud ............... | G06F 12/0253 |
| 6,446,257 B1 | * | 9/2002 | Pradhan .............. | G06F 12/0276 |
| | | | | 707/999.202 |
| 6,865,657 B1 | * | 3/2005 | Traversat ............ | G06F 12/0276 |
| | | | | 707/999.202 |

(Continued)

OTHER PUBLICATIONS

Kopp, M., "How Garbage Collection differs in the Three Big JVMs", Dynatrace APM Blog, dated May 11, 2011, 12 pages, accessed online at <http://apmblog.dynatrace.com/2011/05/11/how-garbage-collection-differs-in-the-three-big-jvms/> on Nov. 12, 2015.*

(Continued)

*Primary Examiner* — Phuong Thao Cao
(74) *Attorney, Agent, or Firm* — Tucker Ellis LLP

(57) ABSTRACT

In accordance with an embodiment, described herein is a system and method for two-tier adaptive heap management (AHM) in a virtual machine environment, such as a Java virtual machine (JVM). In accordance with an embodiment, a two-tier AHM approach recognizes that more virtual machines can be run on a particular host, or the same number of virtual machines can support higher load while minimizing out-of-memory occurrences, swapping, and long old garbage collection pauses, if the heap is divided into tiers, so that a garbage collection policy that minimizes pause time can be used in a first (normal) tier, and a garbage collection policy that favors heap compaction and release of free memory to the host can be used in another (high-heap) tier.

15 Claims, 6 Drawing Sheets

(56) References Cited

U.S. PATENT DOCUMENTS

| | | | | |
|---|---|---|---|---|
| 8,495,107 B2* | 7/2013 | Khanna | G06F 12/023 | 707/813 |
| 8,533,710 B1* | 9/2013 | Long | G06F 9/45558 | 718/1 |
| 8,566,812 B1* | 10/2013 | Printezis | G06F 9/45558 | 717/158 |
| 8,892,610 B1* | 11/2014 | Pang | G06F 12/0253 | 707/813 |
| 9,027,011 B1* | 5/2015 | Lam | G06F 9/44505 | 717/158 |
| 9,158,670 B1* | 10/2015 | Kang | G06F 12/0246 | |
| 2002/0055929 A1* | 5/2002 | Kolodner | G06F 9/4428 | |
| 2002/0194421 A1* | 12/2002 | Berry | G06F 11/3471 | 711/100 |
| 2004/0073764 A1* | 4/2004 | Andreasson | G06F 12/0253 | 711/170 |
| 2004/0078381 A1* | 4/2004 | Blandy | G06F 12/0269 | |
| 2005/0120336 A1* | 6/2005 | Hall | G06F 11/3419 | 717/127 |
| 2006/0179212 A1* | 8/2006 | Kim | G06F 12/0246 | 711/103 |
| 2006/0230087 A1* | 10/2006 | Andreasson | G06F 12/0253 | |
| 2008/0235305 A1* | 9/2008 | Printezis | G06F 12/0253 | |
| 2008/0244545 A1* | 10/2008 | Jamison | G06F 12/0253 | 717/153 |
| 2008/0307192 A1* | 12/2008 | Sinclair | G06F 12/0246 | 711/218 |
| 2009/0150875 A1* | 6/2009 | Maier | G06F 12/0253 | 717/158 |
| 2010/0011357 A1* | 1/2010 | Ramamurthy | G06F 12/0269 | 718/1 |
| 2011/0047550 A1* | 2/2011 | Tachibana | G06F 9/4843 | 718/100 |
| 2011/0083008 A1* | 4/2011 | Raghunandan | G06F 9/5011 | 713/100 |
| 2011/0219204 A1* | 9/2011 | Caspole | G06F 12/0253 | 711/173 |
| 2011/0271276 A1* | 11/2011 | Ashok | G06F 9/5077 | 718/1 |
| 2011/0320682 A1* | 12/2011 | McDougall | G06F 12/023 | 711/6 |
| 2012/0017204 A1* | 1/2012 | Hrischuk | G06F 9/5016 | 717/151 |
| 2012/0131181 A1* | 5/2012 | Birkler | G06F 9/5083 | 709/224 |
| 2012/0166498 A1* | 6/2012 | Gracie | G06F 12/0261 | 707/813 |
| 2012/0198184 A1* | 8/2012 | Adachi | G06F 12/0253 | 711/154 |
| 2012/0310998 A1* | 12/2012 | Burka | G06F 9/45504 | 707/813 |
| 2012/0331018 A1* | 12/2012 | Khanna | G06F 12/023 | 707/813 |
| 2013/0007352 A1* | 1/2013 | Maislos | G06F 12/0246 | 711/103 |
| 2013/0086324 A1* | 4/2013 | Soundararajan | G06F 12/0813 | 711/122 |
| 2013/0160011 A1* | 6/2013 | Corrie | G06F 9/455 | 718/1 |
| 2013/0167147 A1* | 6/2013 | Corrie | G06F 9/45533 | 718/1 |
| 2013/0185337 A1* | 7/2013 | Lipcon | G06F 17/30138 | 707/813 |
| 2013/0290382 A1* | 10/2013 | Adachi | G06F 12/0253 | 707/813 |
| 2013/0290641 A1* | 10/2013 | Corrie | G06F 12/0875 | 711/133 |
| 2014/0115291 A1* | 4/2014 | Caspole | G06F 12/0269 | 711/166 |
| 2014/0196033 A1* | 7/2014 | Bobroff | G06F 9/45558 | 718/1 |
| 2014/0215129 A1* | 7/2014 | Kuzmin | G06F 12/0246 | 711/103 |
| 2014/0324924 A1* | 10/2014 | Ahad | G06F 12/0253 | 707/813 |

OTHER PUBLICATIONS

Blackburn et al., "Myths and Realities: The Performance Impact of Garbage Collection", In Proceedings of the Joint International Conference on Measurement and Modeling of Computer Systems, pp. 15-36, 2004.*

Chen et al., "Tuning Garbage Collection in an Embedded Java Environment", In Proceedings of the Eighth International Symposium on High-Performance Computer Architecture (HPCA '02), IEEE, 12 pages, 2002.*

Meng et al., "Research on Heap and Stack Management Mechanism in Java Virtual Machine", Journal of Convergence Information Technology (JCIT), vol. 8, No. 9, May 2013, pp. 138-144.*

Wilson et al., "Caching Considerations for Generational Garbage Collection", In Proceedings of the 1992 ACM Conference on LISP and Functional Programming (LFP '92), pp. 32-42, 1992.*

* cited by examiner

US 9,448,928 B2

SYSTEM AND METHOD FOR TWO-TIER ADAPTIVE HEAP MANAGEMENT IN A VIRTUAL MACHINE ENVIRONMENT

CLAIM OF PRIORITY

This application claims the benefit of priority to U.S. Provisional application titled "SYSTEM AND METHOD FOR TWO-TIER ADAPTIVE HEAP MANAGEMENT IN A VIRTUAL MACHINE ENVIRONMENT", Application No. 61/816,658, filed Apr. 26, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to resource management in virtual machines, such as Java virtual machines, and are particularly related to a system and method for adaptive heap memory management in a Java virtual machine environment.

BACKGROUND

Typically, in a Java virtual machine (JVM) environment, a startup parameter such as –Xmx can be used to define the maximum heap memory that a particular virtual machine can use. Subsequently, if the virtual machine needs more memory than the maximum specified memory, it will throw an out-of-memory error (OOME). Generally, an out-of-memory error makes the virtual machine useless, and usually, via another startup parameter or by default, the virtual machine is terminated.

An –Xmx value that is set too high can result in swapping at the operating system (OS) level and/or long old (full) garbage collection pause times which can degrade JVM performance considerably. Although some JVMs can release the unused heap memory back to the OS by compacting the heap, they do so incrementally so as not to adversely affect garbage collection (GC) pause time, and thus a JVM may stay at high heap usage for a long time. This increases the probability of swapping and long old GC pause times.

The problem becomes more pronounced when several JVMs are run on a host machine. A high –Xmx value combined with a conservative heap compaction and release policy will reduce the number of JVMs that can be run on a host without causing swapping. It is not unusual to see many of these JVMs using heap memory, referred to as committed or allocated memory, much less than the maximum specified heap memory for much of the time.

SUMMARY

In accordance with an embodiment, described herein is a system and method for two-tier adaptive heap management (AHM) in a virtual machine environment, such as a Java virtual machine (JVM). In accordance with an embodiment, a two-tier AHM approach recognizes that more virtual machines can be run on a particular host, or the same number of virtual machines can support higher load, while minimizing out-of-memory occurrences, swapping, and long old garbage collection pauses, if the heap is divided into tiers, so that a garbage collection policy that minimizes pause time can be used in a first (normal) tier, and a garbage collection policy that favors heap compaction and release of free memory to the host can be used in another (high-heap) tier.

DETAILED DESCRIPTION

Figure 1:
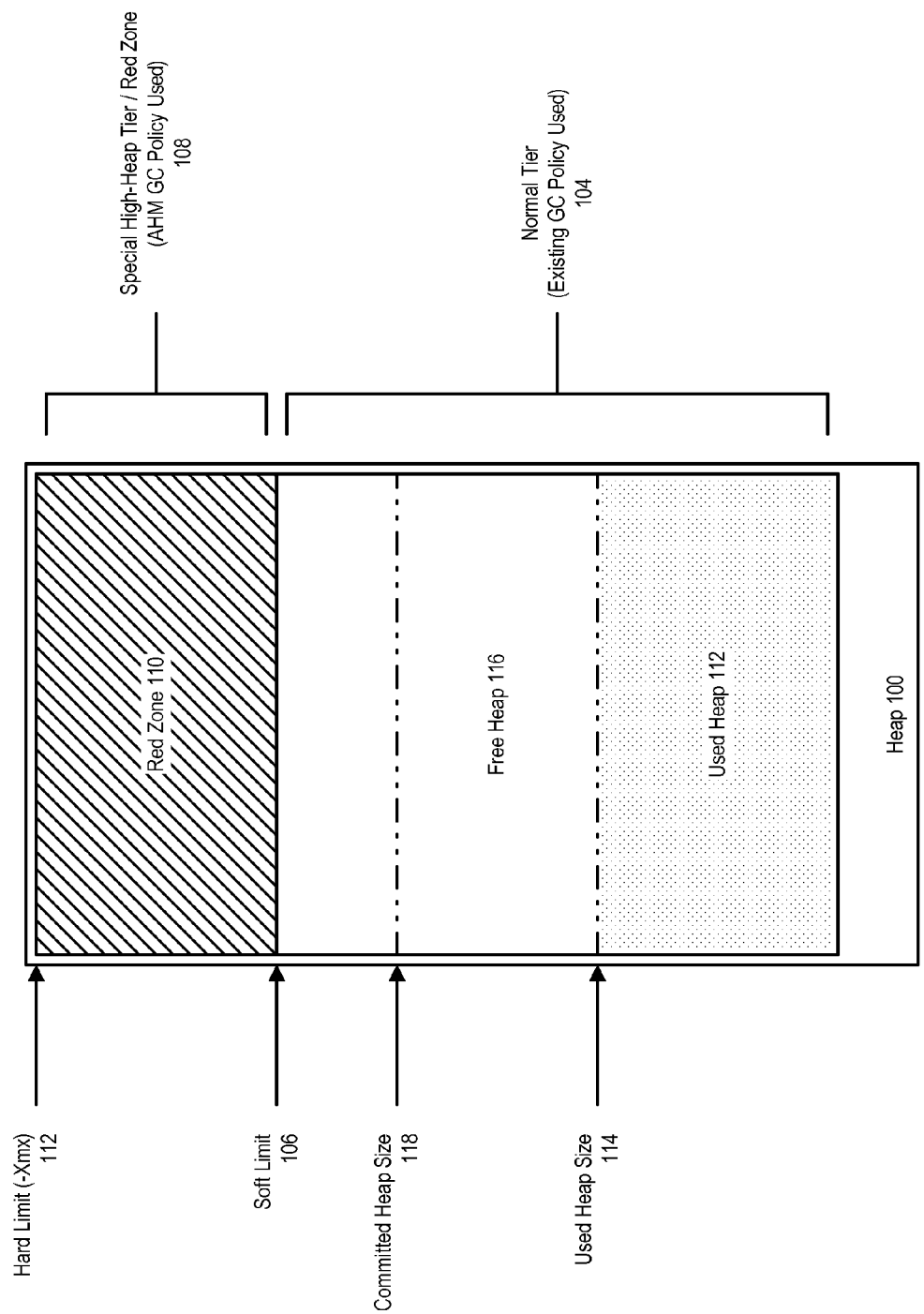
FIG. 1 illustrates two-tier adaptive heap management, in accordance with an embodiment, including a JVM whose heap is in a normal tier.

As described above, typically, in a Java virtual machine (JVM) environment, a startup parameter such as –Xmx can be used to define the maximum heap memory that a particular virtual machine can use. Subsequently, if the virtual machine needs more memory than the maximum specified memory, it will throw an out-of-memory error (DOME). Generally, an out-of-memory error makes the virtual machine useless, and usually, via another startup parameter or by default, the virtual machine is terminated.

In some instances, a virtual machine may throw an out-of-memory error even if the host machine has a lot of free physical or virtual memory. Therefore, application administrators often set the –Xmx value to be equal to or greater than the maximum possible heap memory the virtual machine is expected to use in its lifetime. This may be difficult to determine, since a virtual machine's heap usage may spike for a short time due to several reasons such as startup time or load spike, and those have to be accounted for in the maximum heap usage computation, to avoid out-of-memory errors.

An –Xmx value that is too high can result in swapping at the operating system (OS) level and/or long full garbage collection pause time, which can degrade virtual machine performance considerably. Although some virtual machine environments, such as the JRockit JVM, can free up unused heap memory and return it to the operating system under certain conditions, these conditions generally favor short garbage collection (GC) pause time, and are not aggressive enough in some situations to utilize the memory more efficiently.

The problem becomes more pronounced when several virtual machines need to be run on a host machine.

A high –Xmx value, combined with a conservative heap compaction and release policy, will typically reduce the number of virtual machines that can be run on a host without causing swapping. It is not unusual to see many of these virtual machines using a heap memory (including committed and allocated memory) that is much less than the maximum specified heap memory for much of the time.

For example, in a JRockit JVM environment which uses a genpar garbage collection policy, the virtual machine can release unused heap memory back to the operating system by compacting the heap, which it accomplishes by incremental compaction so as to keep the pause time to a minimum. This frees up unused heap memory slowly, and thus a virtual machine may stay at high heap usage for a long period of time, which in turn increases the probability of swapping.

Adaptive Heap Management (AHM)

In accordance with an embodiment, described herein is a system and method for two-tier adaptive heap management (AHM) in a virtual machine environment, such as a Java virtual machine.

The AHM approach recognizes that more virtual machines can be run on a particular host, or the same number of virtual machines can support higher load, while minimizing the occurrences of out-of-memory errors and swapping, if the heap is divided into two tiers, so that, for example, a garbage collection policy that minimizes pause time can be used in a first (normal) tier, and a garbage collection policy that favors compaction and release of free memory to the host can be used in another (high-heap) tier.

As described herein, the AHM approach to managing virtual machine heap memory is helpful in avoiding out-of-memory errors, swapping, and long old GC pause times associated with temporary spikes, while efficiently utilizing physical memory.

In accordance with an embodiment, a soft limit on the maximum heap memory is introduced. The –Xmx value is treated as a hard limit on memory usage, and has the existing semantics of causing an out-of-memory error when more heap memory is needed. The amount of memory between the soft limit and hard limit is referred to as the red zone. In this manner, the heap can be considered as two tiers: a normal heap tier from zero up to the soft limit; and a special high-heap tier or red zone between the soft limit and the maximum heap size.

In accordance with an embodiment, the garbage collection policy in the normal tier remains unchanged from current garbage collection policies used. The garbage collection policy in the high-heap tier or red zone can try to compact the heap and return the memory to the host quickly, so that the committed memory of the JVM is reduced, thus reducing the full GC pause time for the JVM, and so other virtual machines can use the memory. As such, the red zone can be seen as a zone whose memory is shareable with other virtual machines running on the same host.

In accordance with an embodiment, an adaptive heap management component, such as a JMX MXBean, can be used to define the soft limit and the red zone. In addition, the MXBean can allow an application administrator to specify the memory usage policy for a virtual machine whose heap usage is in the red zone.

For example, a red zone garbage collection policy can allow the application administrator to specify what action to take for a virtual machine whose heap is in the red zone after each old garbage collection. This allows the system to use a very high value for –Xmx and the estimated working set memory size as the soft limit, together with a policy to allow the virtual machine to be in the red zone for a short time, and aggressively compacting and releasing the memory to the operating system to bring the virtual machine's heap usage below the soft limit when the host is running low on free physical memory. This results in better physical memory utilization, and the ability for the virtual machines to handle higher load.

In accordance with an embodiment, the techniques described herein can be used, for example, for maximizing the number of virtual machines that can be run on a host machine, or maximizing the load a fixed set of virtual machine on a host machine can support, while minimizing the number of occurrences of out-of-memory errors, swapping (paging), and long old GC pause times.

While the described approach should not affect the pause time under normal operating conditions, it does favor compaction of the heap to free up enough memory when the host is running low on physical memory. This may cause a one-time pause time rise, in exchange for minimizing out-of-memory errors, swapping, and recurring long old GC pause times.

FIG. 1 illustrates two-tier adaptive heap management, in accordance with an embodiment, including a JVM whose heap is in a normal tier.

As shown in FIG. 1, in accordance with an embodiment, the heap 100 is divided into a plurality of tiers, including a normal tier 104 from zero to a soft limit (SL) 106, in which a first or normal garbage collection policy (e.g., genpar) is used; and a special high-heap or shared tier 108, also referred to as a red zone 110, from the soft limit to the –Xmx value 112, in which a second or AHM garbage collection policy is used (following every normal old garbage collection). For example, the second or AHM garbage collection policy can be one that favors heap compaction and the return of freed memory to the host.

The operation of when and how much memory to free, can be controlled by various parameters, as described in further detail below. Thus, memory can be released to the host more quickly so that other virtual machines can share that memory.

The AHM garbage collection policy can also be designed to accommodate heap usage spikes with little or no swapping. Generally, the use of –Xmx has the same semantics as before, i.e., an attempt to use more heap than that specified by –Xmx will raise an out-of-memory error.

In accordance with an embodiment, as memory is used 112 by the virtual machine, both its actual heap size 114, and its committed or allocated heap size 118 can be determined. Heap space which is committed or allocated, but not in actual use by the virtual machine, is considered free heap space 116.

Figure 2:
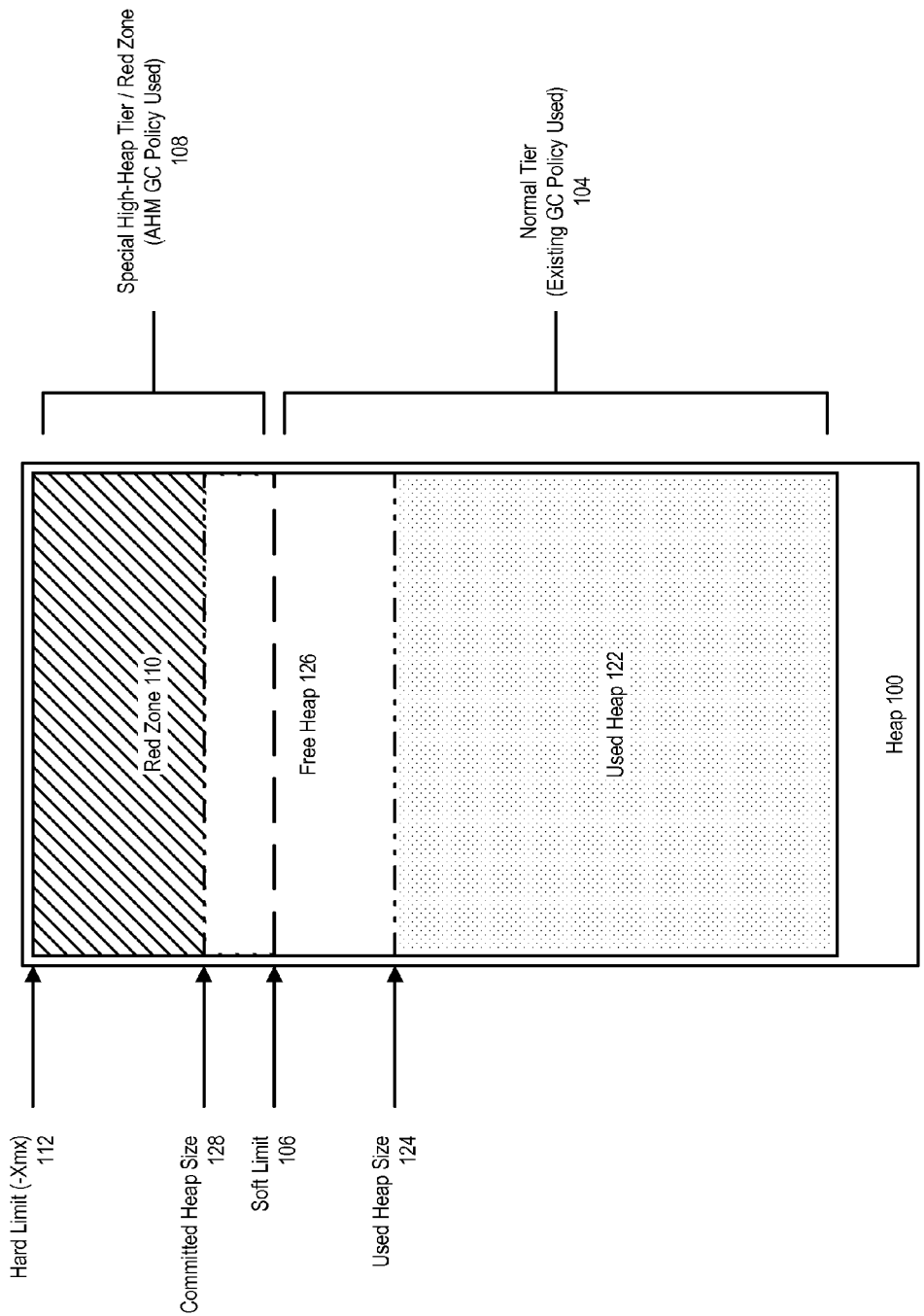
FIG. 2 further illustrates two-tier adaptive heap management, in accordance with an embodiment, including a JVM whose heap is in the red zone.

FIG. 2 further illustrates two-tier adaptive heap management, in accordance with an embodiment, including a JVM whose heap is in the red zone.

As shown in FIG. 2, in accordance with an embodiment, when the heap is being used within the red zone, an AHM garbage collection policy can be used (which in some instances can be used in conjunction with a normal garbage collection policy). For example, as the used heap 122 increases in size 124, such that it's committed heap size 128 is greater than the soft limit representing the beginning of the red zone (even though, as in the illustrated example, there may still be free heap 126 below the soft limit), then the AHM garbage collection policy can be used.

The plurality of tiers, including the normal tier and the high-heap tier or red zone are represented as discrete areas in FIGS. 1 and 2 merely for purposes of illustration. In accordance with an embodiment, the plurality of tiers, including the normal tier and the high-heap tier or red zone need not be provided as such discrete areas within a heap, but instead can represent the level of usage of the heap by a virtual machine at a particular point in time.

In accordance with an embodiment, adaptive heap management permits an application administrator to define the red zone, and a heap memory management policy to be used while the virtual machine is in the red zone. The heap management policy can be defined as a vector of values assigned to variables, for example, as shown in Table 1.

TABLE 1

| Variable Name | Variable Description | Default Value |
|---|---|---|
| $m_x$ | The hard limit on the maximum heap size defined by -Xmx start up parameter. | |
| $m_s$ | The minimum heap size to be allocated for the JVM defined by -Xms startup parameter. | |
| $m_{xsl}$ | The soft limit on the maximum heap size defined by AHM such that $m_x \geq m_{xsl} \geq m_s$. This is specified by the -DMaxHeapMemorySoftLimit startup parameter. | $0.8 * m_x$ (Alternatively, 80% of $m_x$) |
| $m_z$ | The size of the red zone computed as $m_x - m_{xsl}$. The size of the red zone should be large enough to avoid OOME for the applications deployed in the JVM. | |
| $n_z$ | The minimum number of old GCs (the term old GC to refer generically to garbage collection to reclaim memory in older generation heap space. This is also known as the tenured generation GC) that is allowed while the heap is in the red zone. Any value greater than zero may cause swapping but may allow some time for the JVM to go back to its normal heap usage. | 0 |
| $m_r$ | The minimum amount of memory to be released to the host expressed as percentage of $m_z$. AHM will not attempt to compact the memory if it cannot release at least $(m_r * m_z)/100$ bytes to the host. | 5% |
| $m_f$ | In accordance with an embodiment, the minimum amount of committed heap memory that must be free after AHM does the heap compaction, expressed as a percentage of $m_{xsl}$. AHM will not compact the heap if it cannot leave at least $(m_f * m_{xsl})/100$ bytes of heap memory free after compaction. | 10% |
| $m_{hfi}$ | The threshold for free physical memory of the host. | 100 Mb |

In accordance with an embodiment, adaptive heap management works only if $m_z > 0$. Therefore, if $m_x = m_s$, then adaptive heap management is automatically disabled, since there is currently no red zone usage.

If $m_u$ is taken to be the used heap memory size, and $m_c$ the committed heap memory size of the virtual machine (these values can be obtained from a JVM using, e.g., the Java VM MemoryMXBean), in accordance with an embodiment, the AHM component can then instruct the garbage collector to compact the heap using an algorithm as shown below:

```
gcCount = 0;
// keeps track of the number of consecutive old GCs while the
heap is in the red zone
for each old GC completion do
    if (m_c < m_xsl) {
        gcCount = 0; return; //not in the red zone so do nothing
    }
    gcCount += 1;
    m_target = max(m_xsl, (m_u + (m_xsl * m_f/100));
    shrunk = false;
```

-continued

```
    if ((m_c - m_target) > (m_z * m_r/100)){
        compact heap size to m_target
        and release the freed memory to the host OS;
        shrunk = true;
    } if (host free memory > m_hfi)return;
    if (m_u ≥ m_xsl){ // used memory is above the soft limit
    if(gcCount > n_z and forced shutdown is enabled)
        terminate the JVM gracefully;
    }
    else
    if (!shrunk)compact the heap to m_xsl
end for
```

Referring to the above algorithm, in accordance with an embodiment, the first "if statement" tests whether the heap is in the red zone.

If the heap is not in the red zone, then nothing is done. However, if the heap is in the red zone, then the system tests to see if enough memory can be freed and still leave minimum free memory required for the virtual machine. If so, then the heap is compacted to the size equal to the larger of used memory size plus minimum free memory size, and soft limit. The remaining memory is then released to the host operating system.

The second "if statement" tests whether the used heap size is greater than the soft limit, and whether the JVM has exceeded the minimum number of old garbage collection allowed while in the red zone, and whether the host physical free memory is below the threshold. If so, the virtual machine is gracefully terminated.

Figure 3:
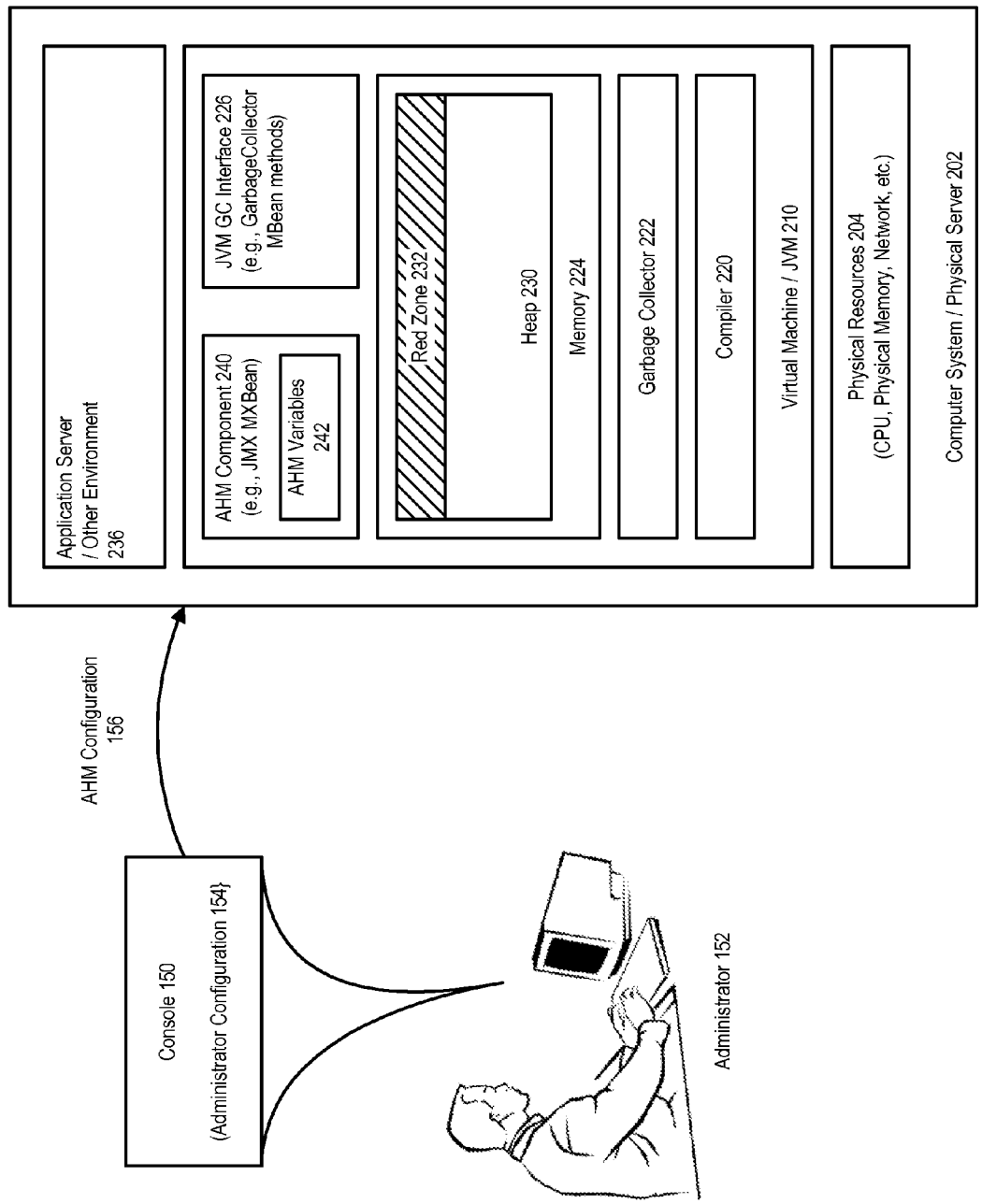
FIG. 3 illustrates a system for two-tier adaptive heap management in a virtual machine, in accordance with an embodiment.

FIG. 3 illustrates a system for two-tier adaptive heap management in a virtual machine, in accordance with an embodiment.

As shown in FIG. 3, in accordance with an embodiment, the system can include a computer system or physical server 202 that includes physical resources 204 (for example, CPU, physical memory, network components), an application server 236, and one or more virtual machines/JVMs 210, each of which is associated with a compiler 220, garbage collector 222, available memory space 224, and virtual machine garbage collection interface 226 (for example, in a JRockit environment, the interface may include JRockit's GarbageCollectorMBean methods).

In accordance with an embodiment, each virtual machine includes a heap 230 and a defined red zone 232. In accordance with an embodiment, the JVM also has an AHM component 240 (e.g., a JMX MXBean) suitably configured with AHM variables 242, examples of which as described above, can be used to control the two-tier adaptive heap management of the virtual machine.

In accordance with an embodiment, a console or other administrative tool 150 can allow an application administrator 152 to provide heap management configuration 154, including AHM configuration information 156.

In accordance with an exemplary embodiment, the host free memory computation can take into account factors such as 50% of the memory being used by operating system buffers can be used for the JVM heap.

Figure 4:
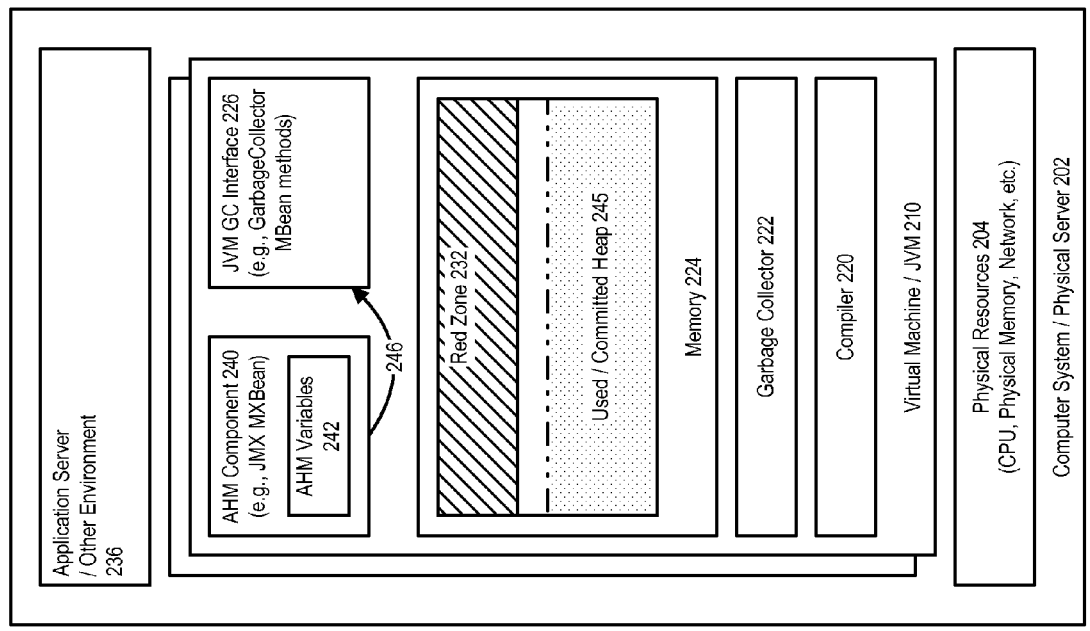
FIG. 4 illustrates two-tier adaptive heap management in a virtual machine, in accordance with an embodiment.
Figure 4:
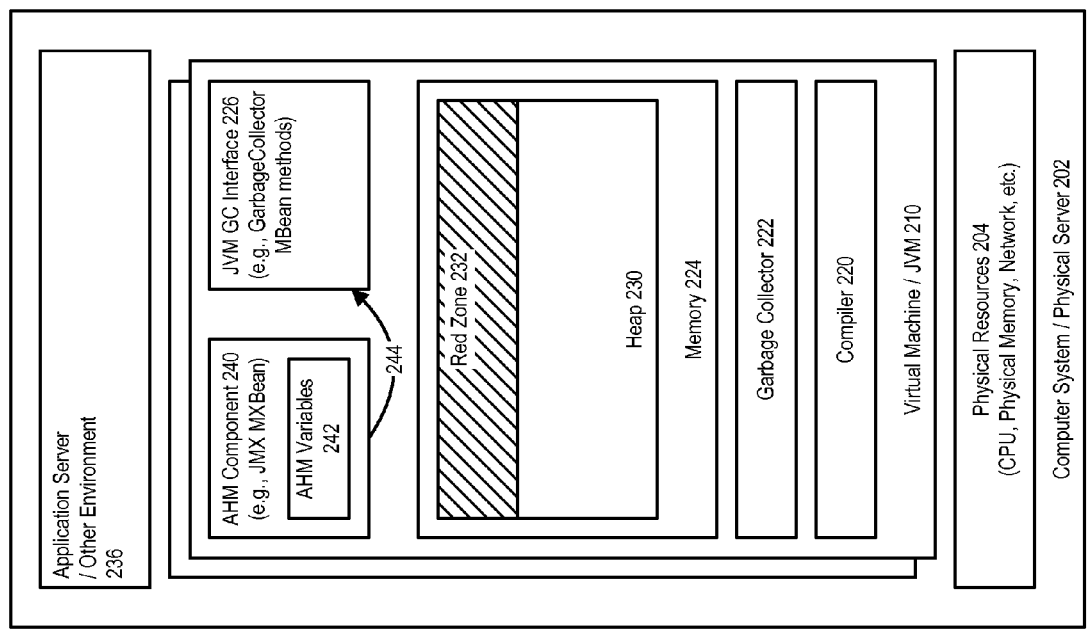

FIG. 4 illustrates two-tier adaptive heap management in a virtual machine, in accordance with an embodiment. As shown in FIG. 4, each virtual machine includes a heap and a defined red zone. An AHM component (e.g., a JMX MXBean) suitably configured with AHM variables, examples of which as described above, can be used to control 244 the two-tier adaptive heap management of the virtual machine. In accordance with an embodiment, as memory is used by the virtual machine, both its actual heap size and its committed or allocated heap size can be determined. As long as heap usage 245 is within a normal tier, from zero to a soft limit, then the AHM component instructs the garbage collector that a first or normal garbage collection policy should be used 246.

Figure 5:
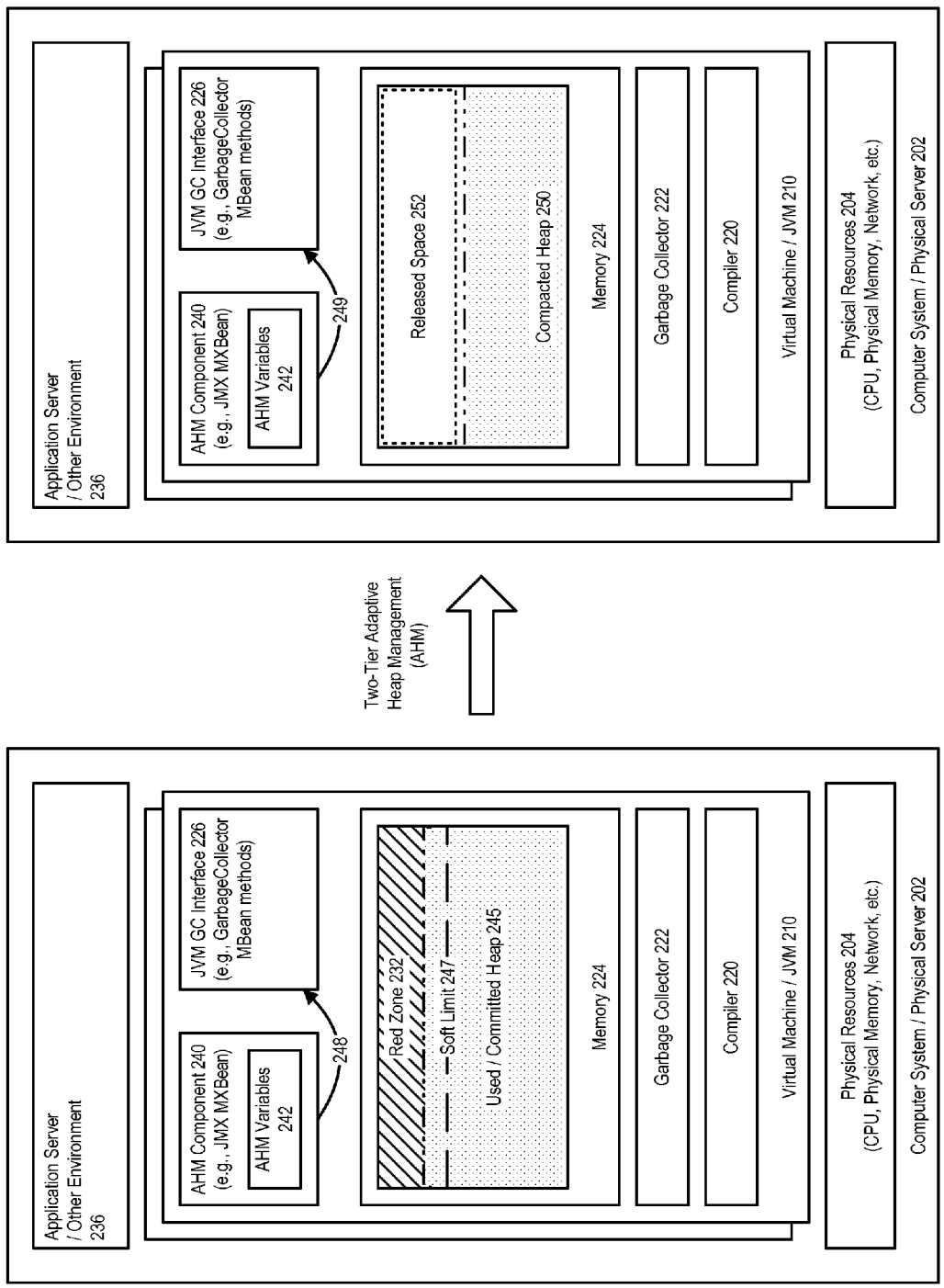
FIG. 5 further illustrates two-tier adaptive heap management in a virtual machine, in accordance with an embodiment.

FIG. 5 further illustrates two-tier adaptive heap management in a virtual machine, in accordance with an embodiment. As shown in FIG. 5, if the system determines that heap usage is within a special high-heap tier or red zone, above the soft limit 247 (but less than e.g., the −Xmx value), then the AHM component instructs the garbage collector that a second or AHM garbage collection policy should be used 248.

For example, the second or AHM garbage collection policy can be one that favors heap compaction and the return of freed memory to the host. The garbage collector can then be instructed 249 to compact the heap 250 to the size equal to the used memory size plus minimum free memory size, and the remaining memory released 252 to the host operating system.

Figure 6:
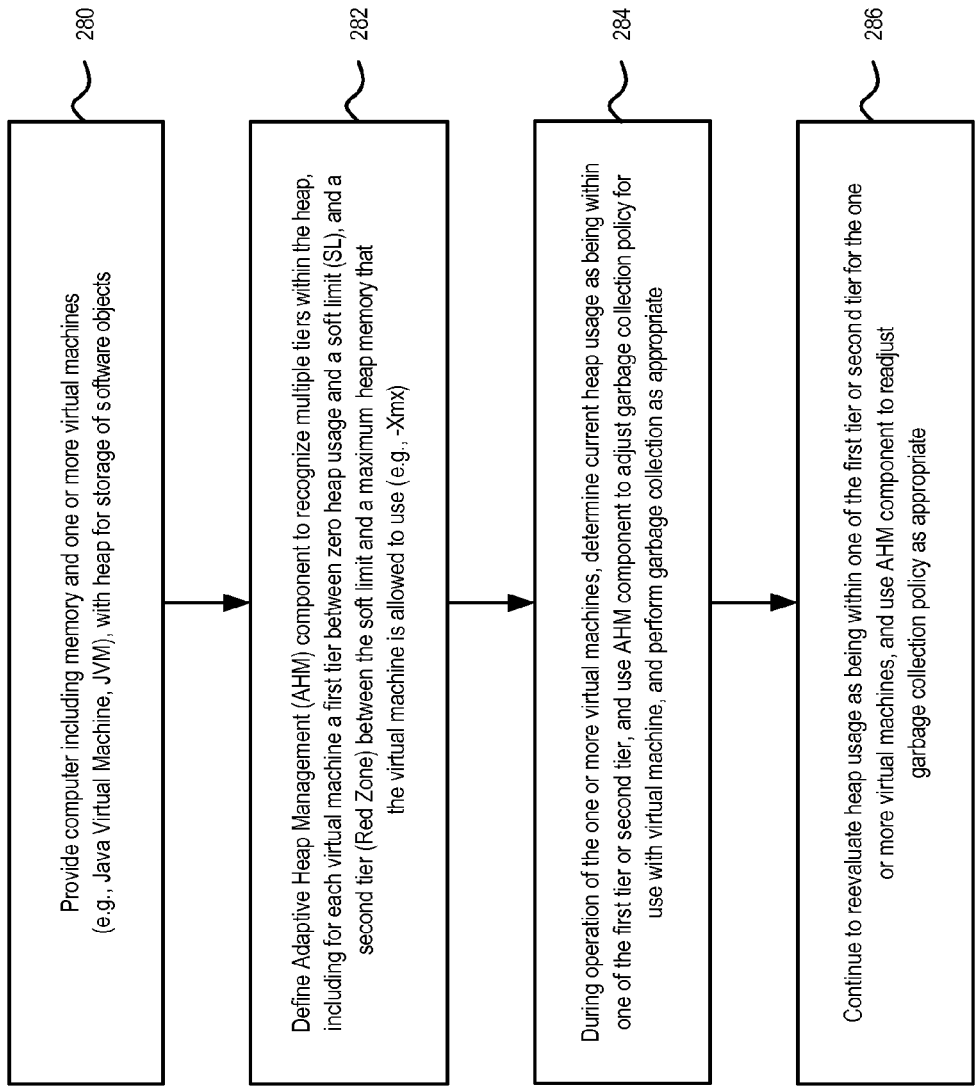
FIG. 6 is a flowchart of a method for using two-tier adaptive heap management in a virtual machine, in accordance with an embodiment.

FIG. 6 is a flowchart of a method for using two-tier adaptive heap management in a virtual machine, in accordance with an embodiment.

As shown in FIG. 6, at step 280, a computer including memory and one or more virtual machines (e.g., Java Virtual Machine, JVM), with heap for storage of software objects, is provided.

At step 282, an Adaptive Heap Management (AHM) component is defined or otherwise configured to recognize multiple tiers within the heap, including, for each virtual machine, a first tier between zero heap usage and a soft limit, and a second tier (red zone) between the soft limit and a maximum heap memory that the virtual machine is allowed to use (e.g., an −Xmx value).

At step 284, during operation of the one or more virtual machines, the system determines a current heap usage as being within one of the first tier or second tier, and uses the AHM component to adjust the garbage collection policy for use with virtual machine, and perform garbage collection as appropriate.

At step 286, the system continues to reevaluate heap usage as being within one of the first tier or second tier for the one or more virtual machines, and uses the AHM component to readjust garbage collection policy as appropriate.

EXAMPLE IMPLEMENTATIONS

Described below are various embodiments and examples which generally describe use of adaptive heap management with a virtual machine, including, for example a Java virtual machine such as a JRockit JVM. Other embodiments can be provided for use with other types of virtual machine or other types of garbage collected environments.

Example 1

In accordance with an exemplary embodiment, an automatic heap management algorithm can be implemented in an MXBean for use in, for example, an environment including WebLogic Server 10.3.5 and JRockit R28.

In accordance with other embodiments, different implementations can be used for different environments (e.g., an AdaptiveHeapMgmtMXBean for use with (plain) WebLogic Server environments, or an AdaptiveHeapMgmtFMWMX-Bean for use with Fusion Middleware environments).

In accordance with an embodiment, an AdaptiveHeapMgmtFMWMXBean, which extends AdaptiveHeapMgmtMXBean, can include additional attributes and methods to generate Automatic Diagnostic Repository (ADR) incidents before a JVM is terminated. For example, an ADR incident can encapsulate diagnostic data and include an option to include a heap dump.

In accordance with an embodiment, the AdaptiveHeapMgmtMXBean subscribes to old garbage collection notification, and uses the JVM garbage collection interface (e.g., JRockit's GarbageCollectorMBean methods) to force compaction of the heap and release memory to the host operating system.

In accordance with an embodiment, the garbageCollectorMBean. setAllocatedHeapSizeTarget(heapSizeAllocatedTarget) method is used to set the allocated heap size and garbageCollectorMBean.gc( ) to force the garbage collection with compaction. When the AdaptiveHeapMgmtFMW-MXBean is used, its ADR related attributes and methods can be specified. Table 2 illustrates exemplary attributes of AdaptiveHeapMgmtMXBean, in accordance with an embodiment.

TABLE 2

| Attribute Name | Description |
| --- | --- |
| AdaptiveHeapManagementEnabled | Specifies whether adaptive heap management feature is enabled or not. Disabling it stops the red zone monitoring only. (default: true). |
| MaxHeapMemorySoftLimit | Specifies the heap memory soft limit ($m_{xsl}$). When the committed heap size is above this number adaptive heap management will be activated. The default value is 80% of maximum heap size (80% of the -Xmx value). |
| RedZoneFreeHeapPercentage | The size of the red zone $m_z$ is $m_x - m_{xsl}$ where $m_x$ is max heap size specified by -Xmx value. The RedZoneFreeHeapPercentage ($m_f$) specifies the percentage of $m_{xsl}$ that should be free after the committed heap is shrunk. (default: 10). |
| RedZoneMinReleasePercentage | The minimum heap memory that can be released to the OS ($m_r$), expressed as a percentage of $m_z$. Red zone will not be shrunk if at least this amount of memory cannot be returned to the host considering the free heap that must be kept as specified by RedZoneFreeHeapPercentage. (default: 5). |
| NumberOfGCsInRedZone | Specifies the minimum number of consecutive old GCs in the red zone before action is taken. (default: 0). A value greater than zero should be used if the JVM should be allowed in the red zone for a period of time possibly at the expense of swapping. |
| HostMemoryThreshold | Specifies the host memory threshold ($m_{hft}$) to force shutdown of JVMs in the red zone that have NumberOfGCsInRedZone or more consecutive old GCs in the red zone. The force shutdown feature can be disabled by setting ForcedShutdownEnabled to false in which case AHM will aggressively shrink the memory in red zone but will not shutdown the JVM. (default: 100 MB). |
| ForcedShutdownEnabled | Specifies whether shutdown is enabled when the above condition is met. (default: true). |
| AdaptiveHeapMgmtState (read-only) | Shows the current state of adaptive heap management. The possible values are: Enabled - the adaptive heap management is enabled but the memory usage has not reached MaxHeapMemorySoftLimit. Active - the adaptive heap management is enabled and is actively monitoring the heap which is in the red zone, i.e., heap size is greater than MaxHeapMemorySoftLimit. Disabled - the adaptive heap management is disabled. |

TABLE 2-continued

| Attribute Name | Description |
| --- | --- |
| NumberOfGCsinRed-ZoneCounter | Displays the total number of GCs that happen while the heap is in the red zone. Every time the memory usage goes below MaxHeapMemorySoftLimit this value is reset to 0. |
| ADRIncidentEnabled | Specifies whether AdaptiveHeapMgmtFMWMXBean will generate an ADR incident when the free heap is less than ADRIncidentHeapThreshold or when the heap is in the red zone and the condition for termination is met. (default: true). |
| ADRIncidentHeap-Threshold | Specifies the amount of free heap from the maximum heap size below which an ADR incident will be generated, if enabled by ADRIncidentEnabled attribute. That is, If the JVM's free heap memory is below this number, an ADR incident will be generated. (default: 20 MB). |
| TimeBetweenIncidentGeneration | Specifies the minimum time interval between incident generations. Another incident will not be generated within this time of the previous incident. (default: 30 min). |
| HeapDumpEnabled | Specifies whether a heap dump will be generated and included with the ADR incident. If possible, the heap dump will be included in the ADR incident. Otherwise, it will be put in the heap dump in the location specified by the JVM startup parameters. (default: true). |
| HeapMemoryFree (read only) | Displays the free heap memory. The free heap memory is calculated using the formula (max heap size − Runtime.getRuntime( ).totalMemory( )) + Runtime.getRuntime( ).freeMemory( ). |
| HeapSizeAllocatedTarget (read only) | Displays the target set for allocated memory for the heap as returned by the oracle.jrockit.management.GarbageCollectorMBean. |
| IncidentGenerated-Counter (read only) | Displays the number of incident generated since JVM started. |
| IncidentReportedCounter (read only) | Displays the number of incident reported since JVM started. Every time an ADR incident generation is requested and the timeout for incident generation is not reached it increments this counter. |
| IncidentGenerated-LastTime (read only) | Displays the last time when an ADR incident was generated. |
| HostFreeMemory (read only) | Displays the host free memory. It gets the host free memory plus 50% of memory used by OS buffers to calculate this value. |
| Shutdown State (read only) | Displays the state of the JVM shutdown: Enabled - Shut down of JVM is enabled if the conditions specified in AdaptiveHeapMgmtMXBean are met. Active - The JVM has been queued for shutting down. The host free memory will be tested again before the JVM is actually terminated. Disabled - JVM will not be terminated by this MXBean. |
| StartupSystemProperties (read only) | Displays the attributes that were specified in the startup command line. |

In accordance with an embodiment, the above-described approach was used in an environment including a host with 8 Gb of physical memory, four WebLogic servers (an administration server and three managed servers) to show that AHM did indeed minimize the occurrences of OOME and swapping in an application. The application uses a number of threads deployed in the server. Each thread consumes heap memory from b MB to b+Δh MB that varies with time. The maximum −Xmx value for the JVMs that would accommodate the largest number of threads without causing OOME or swapping was used. Then the AHM MXBean was enabled, and the swapping activity was reduced to near zero.

Example 2

In accordance with an exemplary embodiment that uses JRockit, examination of the JVM heap usage behavior may indicate that, when −Xmx is increased, the committed heap size also increases for the same application (larger free heap). The JRockit JVM GarbageCollectorMBean also provides a setHeapSizeLock(true) to set the max heap size to committed heap size; and a setAllocatedHeapSizeTarget(x) to compact committed heap to size (x±∂).

In accordance with an embodiment, examples of adjustments for the JRockit heap allocation policy can include to lock heap size at the soft limit when committed heap size approaches soft limit to control committed heap growth; unlock to expand beyond a soft limit; or to allow committed memory to go below a soft limit. In accordance with an embodiment, an algorithm for use in such an environment is provided as shown below:

```
after each Old GC do
if (isHeapSizeLocked( )) {
//unlock heap if free heap is too small or too large
if ((freeCommittedHeapSize < getMinFreeHeapSize( )) ||
(freeCommittedHeapSize > getMaxFreeHeapSize( )))
unlockHeapSize( );
} else {   // heap size is not locked
if(committedHeapSize > (softLimit − delta)
doRedZoneAction(usedHeapSize, committedHeapSize, softLimit);
else {
resetRedZoneCounter( );
if((usedHeapSize + getMinFreeHeapSize( )) < softLimit) {
if((committedHeapSize >= (softLimit − delta)) &&
(committedHeapSize <= (softLimit + delta)))
setHeapSizeLock(true); //lock heap at committed size
else if((committedHeapSize +
getSoftLimitProximityThresholdSize( )) > softLimit)
setAllocatedHeapSizeTarget (softLimit);
// we will lock near this in the next round
}}}
void doRedZoneAction (long usedHeapSize, long
committedHeapSize, long softLimit) {
long targetHeapSize = Math.max((usedHeapSize +
getMinFreeHeapSize( )), softLimit);
boolean heapHasBeenShrunk = false;
if((committedHeapSize − targetHeapSize) >=
getReleaseHeapThresholdSize( )) {
setAllocatedHeapSizeTarget(targetHeapSize);
heapHasBeenShrunk = true;
}
if(getHostFreeMemory( ) > getHostFreeMemoryThreshold( )) return;
// do nothing if there is enough host memory free
if (usedHeapSize >= softLimit) {
if((numberOfGCsInRedZoneCounter >=
getMaxAllowedGCsInRedZone( ))
&& isForcedShutdownEnabled( ))
// Schedule a shutdown. We will check heap again before actual
shutdown
scheduleShutdown( ); }
else
// compact the heap to soft limit if it has not been shrunk
yet
if(!heapHasBeenShrunk) setAllocatedHeapSizeTarget (softLimit);
```

In accordance with various embodiments, exemplary scenarios to minimize occasional OOME include deploying an AHMMXBean in WLS on JRockit JVM, and starting a WLS server with a higher value for −Xmx (e.g., −Xmx=2 GB instead of 1.6 GB).

To increase load support where possible, the application administrator can start with a soft limit set to working set size; set −Xmx quite high to avoid OOME; and adjust AHMMXBean attribute values accordingly. Values such as AHMMXBean attribute values can be set and monitored with administrative tools or consoles such as, for example Mission Control, EM, or any Mbean browser and used in WLDF Watch rules.

Generally, AHM may not be needed if the host free RAM size is greater than or equal to the product of the maximum heap size a JVM needs, times the number of JVMs desired to be run on the host. AHM may be beneficial if the host free RAM is less than this value but greater than or equally to the product of the working set heap size of JVM, times the number of JVMs desired to be run on the host.

In some instances, an application may have load spikes raising the heap size to the maximum heap size. In such instances, to avoid out-of-memory errors and swapping or performance degradation, an application administrator can set the soft limit to equal the working set heap size, and set the value for −Xmx to equal the maximum heap size, and configure some swap space.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. For example, although the embodiments and examples described above generally describe use of adaptive heap management with a Java virtual machine, such as a JRockit JVM, other embodiments can be provided for use with other types of virtual machine or other types of garbage collected environments. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for two-tier adaptive heap management in a virtual machine, comprising:
a computer including a hardware processor and a memory; and
an adaptive heap management component, which executes at the computer, and interacts with a virtual machine operating on the computer and associated with a heap, so that a garbage collection policy that minimizes pause time is used with a first tier representative of a first level of usage of the heap, and a garbage collection policy that favors compaction and release of free memory is used with a second tier representative of a higher level of usage of the heap;
wherein the adaptive heap management component
determines a soft limit on maximum heap size which is greater than a minimum heap size value as defined by a startup parameter, and
less than a maximum heap size value as defined by a startup parameter,
determines the second tier representative of the higher level of usage of the heap to be a level of heap usage that is between the soft limit on maximum heap size and the maximum heap size value, and
evaluates, while the level of heap usage is within the second tier representative of the higher level of usage of the heap, an amount of memory that would be freed by compaction, and, based on the amount of memory that would be freed, determines whether to compact the heap.

2. The system of claim 1, wherein the adaptive heap management component enables more virtual machines to be run on a particular host while minimizing out-of-memory occurrences, swapping, and long old garbage collection pauses.

3. The system of claim 1, wherein the adaptive heap management component enables a same number of virtual machines running on a particular host to support a higher load while minimizing out-of-memory occurrences, swapping, and long old garbage collection pauses.

4. The system of claim 1, wherein the amount of memory that would be freed by compaction is evaluated to determine if sufficient memory can be freed while leaving a minimum free memory required for the virtual machine, and if so then a determination is made to compact the heap.

5. The system of claim 1, whereupon the adaptive heap management component determining to compact the heap, the heap is compacted to a size equal to the larger of:
a used memory size plus a minimum free memory size, or
the soft limit on maximum heap size.

6. A method for two-tier adaptive heap management in a virtual machine, comprising:
providing, at a computer including a processor and a memory, an adaptive heap management component, which interacts with a virtual machine operating on the computer and associated with a heap, so that a garbage collection policy that minimizes pause time is used with a first tier representative of a first level of usage of the heap, and a garbage collection policy that favors compaction and release of free memory is used with a second tier representative of a higher level of usage of the heap;
determining, by the adaptive heap management component, a soft limit on maximum heap size which is greater than a minimum heap size value as defined by a startup parameter, and
less than a maximum heap size value as defined by a startup parameter;
determining, by the adaptive heap management component, the second tier representative of the higher level of usage of the heap to be a level of heap usage that is between the soft limit on maximum heap size and the maximum heap size value; and
evaluating, while the level of heap usage is within the second tier representative of the higher level of usage of the heap, an amount of memory that would be freed by compaction, and, based on the amount of memory that would be freed, determining whether to compact the heap.

7. The method of claim 6, wherein the adaptive heap management component enables more virtual machines to be run on a particular host while minimizing out-of-memory occurrences, swapping, and long old garbage collection pauses.

8. The method of claim 6, wherein the adaptive heap management component enables a same number of virtual machines running on a particular host to support a higher load while minimizing out-of-memory occurrences, swapping, and long old garbage collection pauses.

9. The method of claim 6, wherein the amount of memory that would be freed by compaction is evaluated to determine if sufficient memory can be freed while leaving a minimum free memory required for the virtual machine, and if so then a determination is made to compact the heap.

10. The method of claim 6, whereupon the adaptive heap management component determining to compact the heap, the heap is compacted to a size equal to the larger of:
 a used memory size plus a minimum free memory size, or the soft limit on maximum heap size.

11. A non-transitory computer readable storage medium, including instructions stored thereon which when read and executed by one or more computers cause the one or more computers to perform the steps comprising:
 providing, at a computer including a processor and a memory, an adaptive heap management component, which interacts with a virtual machine operating on the computer and associated with a heap, so that a garbage collection policy that minimizes pause time is used with a first tier representative of a first level of usage of the heap, and a garbage collection policy that favors compaction and release of free memory is used with a second tier representative of a higher level of usage of the heap;
 determining, by the adaptive heap management component, a soft limit on maximum heap size which is
  greater than a minimum heap size value as defined by a startup parameter, and
  less than a maximum heap size value as defined by a startup parameter;
 determining, by the adaptive heap management component, the second tier representative of the higher level of usage of the heap to be a level of heap usage that is between the soft limit on maximum heap size and the maximum heap size value; and
 evaluating, while the level of heap usage is within the second tier representative of the higher level of usage of the heap, an amount of memory that would be freed by compaction, and, based on the amount of memory that would be freed, determining whether to compact the heap.

12. The non-transitory computer readable storage medium of claim 11, wherein the adaptive heap management component enables more virtual machines to be run on a particular host while minimizing out-of-memory occurrences, swapping, and long old garbage collection pauses.

13. The non-transitory computer readable storage medium of claim 11, wherein the adaptive heap management component enables a same number of virtual machines running on a particular host to support a higher load while minimizing out-of-memory occurrences, swapping, and long old garbage collection pauses.

14. The non-transitory computer readable storage medium of claim 11, wherein the amount of memory that would be freed by compaction is evaluated to determine if sufficient memory can be freed while leaving a minimum free memory required for the virtual machine, and if so then a determination is made to compact the heap.

15. The non-transitory computer readable storage medium of claim 11, whereupon the adaptive heap management component determining to compact the heap, the heap is compacted to a size equal to the larger of:
 a used memory size plus a minimum free memory size, or the soft limit on maximum heap size.

* * * * *

UNITED STATES PATENT AND TRADEMARK OFFICE
CERTIFICATE OF CORRECTION

| | | |
|---|---|---|
| PATENT NO. | : 9,448,928 B2 | Page 1 of 1 |
| APPLICATION NO. | : 14/145720 | |
| DATED | : September 20, 2016 | |
| INVENTOR(S) | : Ahad et al. | |

It is certified that error appears in the above-identified patent and that said Letters Patent is hereby corrected as shown below:

In the Specification

In Column 2, Line 37, delete "(DOME)." and insert -- (OOME). --, therefor.

Signed and Sealed this
Twenty-fifth Day of April, 2017

Michelle K. Lee
*Director of the United States Patent and Trademark Office*